United States Patent
Itoh et al.

[11] Patent Number: 5,901,615
[45] Date of Patent: May 11, 1999

[54] STEERING WHEEL FOR MOTOR VEHICLES

[75] Inventors: Yuichi Itoh; Akira Uchiyama, both of Ichihara; Motoshi Matsuura, Nishikasugai-gun; Yoshio Yamazaki, Nishikasugai-gun; Tsugunori Sugiura, Nishikasugai-gun; Junji Koizumi, Nishikasugai-gun; Sadao Uchida, Nishikasugai-gun; Minoru Niwa, Nishikasugai-gun; Kimio Jyougan, Nishikasugai-gun; Tooru Koyama, Nishikasugai-gun; Shinichi Imazu, Nishikasugai-gun, all of Japan

[73] Assignees: Mitsui Chemicals, Inc., Tokyo; Toyoda Gosei Co., Ltd., Aichi, both of Japan

[21] Appl. No.: 08/750,450

[22] PCT Filed: Apr. 2, 1996

[86] PCT No.: PCT/JP96/00896

§ 371 Date: Dec. 6, 1996

§ 102(e) Date: Dec. 6, 1996

[87] PCT Pub. No.: WO96/31567

PCT Pub. Date: Oct. 10, 1996

[30] Foreign Application Priority Data

Apr. 7, 1995 [JP] Japan ..................... 7-082674

[51] Int. Cl.[6] .............. B62D 1/04; G05G 1/10; C08L 75/00; C08L 77/00
[52] U.S. Cl. ............... 74/552; 521/137; 428/90
[58] Field of Search ............. 74/552; 521/137, 521/140, 159, 174, 176; 428/90, 95, 174, 517, 521, 424.8, 35.2; 525/223, 227, 328.9, 92 A; 524/505, 484

[56] References Cited

U.S. PATENT DOCUMENTS

| | | | |
|---|---|---|---|
| 4,816,313 | 3/1989 | Hosokawa et al. | 428/90 |
| 4,994,502 | 2/1991 | Markovs et al. | 521/137 |
| 5,248,542 | 9/1993 | Sawada et al. | 428/35.2 |
| 5,550,190 | 8/1996 | Hasegawa et al. | 525/92 A |

FOREIGN PATENT DOCUMENTS

| | | |
|---|---|---|
| 2-53849 | 2/1990 | Japan . |
| 2300250 | 12/1990 | Japan . |
| 2308845 | 12/1990 | Japan . |
| A 2300250 | 12/1990 | Japan . |
| 03045646 | 2/1991 | Japan . |
| 5-51494 | 3/1993 | Japan . |
| 6136191 | 5/1994 | Japan . |
| 8113695 | 5/1996 | Japan . |

*Primary Examiner*—Vinh T. Luong
*Attorney, Agent, or Firm*—Sherman and Shalloway

[57] ABSTRACT

A steering wheel for motor vehicles which is composed of a steering wheel base covered with a skin material of: (I) 10–50 parts by weight of a polyethylene resin (A); and (II) 90-50 parts by weight of a block copolymer (B) including a polymer block (a) of styrene or a derivative thereof and an isoprene polymer block or an isoprene-butadiene copolymer block (b), the polymer or copolymer block containing 40% or higher of isoprene units bonded at 3,4- position relative to the total isoprene units and 97% or more of the double bonds having been hydrogenated, (the total amount of the components (A) and (B) is 100 parts by weight). The skin material for the steering wheel is a soft, injection-moldable thermoplastic olefin elastomer composition having a low specific gravity and good wear resistance, which is capable of recycling and gives excellent feel of touch.

10 Claims, 2 Drawing Sheets

STEERING WHEEL FOR MOTOR VEHICLES

TECHNICAL FIELD

The present invention relates to a steering wheel for motor vehicles and, more specifically, to a steering wheel for motor vehicles comprising a skin material made of an injection-moldable material which has a low specific gravity and excellent wear resistance, is capable of recycling, and gives excellent feel of touch.

BACKGROUND ART

Soft vinyl chloride resin materials and RIM urethane materials, both of which are injection moldable, have widely been used in recent years as a soft skin material of a steering wheel for motor vehicles. In particular, the RIM urethane materials predominate in the skin material for steering wheels because of their good wear resistance and imparting soft touch.

However, the RIM urethane materials have such problems that a cycle for molding is long, it takes a long time for a post-treatment processing, and have problems in view of recycling the scrap molded articles thereof such that RIM urethane materials cannot be melt again because they are thermoset resins.

Furthermore, the soft vinyl chloride resin materials have problems of a high specific gravity and generation of chlorine gases when heated for recycling the scrap molded articles thereof.

Therefore, a soft, recyclable injection molding material having a low specific gravity has been desired as a skin material of a steering wheel for motor vehicles. For the materials as described above, thermoplastic olefin elastomers are suitable.

However, conventional thermoplastic olefin elastomer materials have not been used as the skin material of the steering wheel for the motor vehicles because they are low in wear resistance that is an essential requirement for the skin material of the steering wheel for the motor vehicles.

With this respect, the present inventors have earnestly studied to obtain an injection-moldable soft thermoplastic olefin elastomer material having a low specific gravity and good wear resistance, which is capable of recycling and gives good feel of touch, and have found that a thermoplastic elastomer composition containing a polyethylene resin and a styrene block copolymer at a particular proportion has the above mentioned properties or effects. The present invention was thus completed.

The present invention was made to solve the problems associated with the conventional arts as described above, and an object thereof is to develop an injection-moldable soft thermoplastic olefin elastomer composition having a low specific gravity and excellent wear resistance, which is capable of recyling and gives good feel of touch, and to provide a steering wheel for motor vehicles of which skin material is made of that composition.

SUMMARY OF THE INVENTION

A steering wheel according to the present invention comprises a skin material comprising:

(I) 10–50 parts by weight of a polyethylene resin (A); and (II) 90-50 parts by weight of a block copolymer (B) comprising a polymer block (a) of styrene or a derivative thereof and an isoprene polymer block or an isoprene-butadiene copolymer block (b), said polymer or copolymer block containing 40% or higher of isoprene units bonded at 3,4- position relative to the total isoprene units and 97% or more of double bonds having been hydrogenated, wherein the total amount of the components (A) and (B) is 100 parts by weight.

BEST MODE FOR CARRYING OUT THE INVENTION

Figure 1:
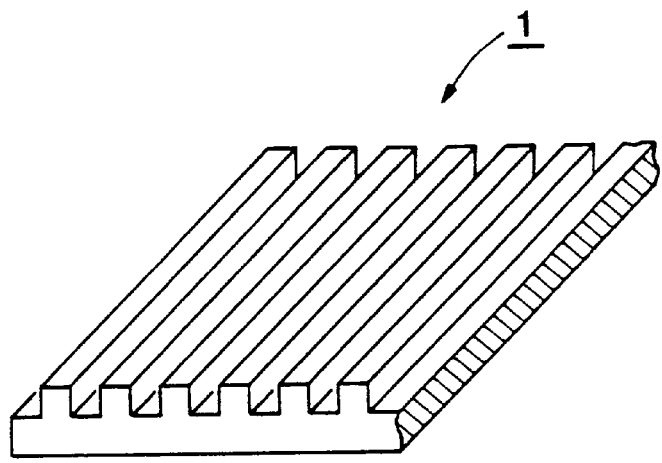
FIG. 1 is a partial perspective view of a test piece subjected to Ford abrasion test in examples, etc.

Hereinafter, a steering wheel for motor vehicles according to the present invention is described in detail.

The steering wheel for the motor vehicles according to the present invention is generally composed of a steering wheel base 8 and a skin material 9 laminated thereon. The skin material used for the steering wheel for the motor vehicles according to the present invention is formed of a thermoplastic elastomer composition containing a polyethylene resin (A) and a styrene-based block copolymer (B), and if necessary, a partially cross-linked thermoplastic elastomer (C) and a silicone oil (D).

Material to Form Base

Materials used to form the above mentioned base (core metal) include, specifically, alloys containing iron, aluminum, or magnesium as a main gredient. Of these, iron-based and aluminum-based alloys are preferably used.

Thermoplastic Elastomer Composition as Skin Material

Polyethylene Resins (A)

The polyethylene resin (A) used in the present invention may be high-density polyethylene resins, medium-density polyethylene resins, low-density polyethylene resins, or a low-density straight-chain polyethylene resins. Of these, the high-density polyethylene resins are preferred because of their good wear resistance. A molecular weight of the polyethylene resin (A) is not limited specifically. However, polyethylene resins having a weight average molecular weight (Mw) of 300,000 or more are preferable in view of the wear resistance and feeling of touch on a surface (stickiness). In particular, polyethylene resins having a weight average molecular weight (Mw) of 400,000 or more are preferable.

The polyethylene resin (A) as described above is used at a rate of 10–50 parts by weight, preferably 15–45 parts by weight, and more preferably 20–45 parts by weight relative to 100 parts by weight of the total amount of the polyethylene resin (A) and the block copolymer (B).

Block Copolymer (B)

The block copolymer (B) used in the present invention comprises a polymer block (a) of styrene or a derivative thereof, and a block (b) of a hydrogenated isoprene polymer or a hydrogenated isoprene-butadiene copolymer.

A polymer component composing the above mentioned block (a) is styrene or a derivative thereof.

Specific examples of the derivative of styrene include α-methylstyrene, 1-vinylnaphthalene, 2-vinylnaphthalene, 3-methylstyrene, 4-propylenestyrene, 4-cyclohexylstyrene, 4-dodecylstyrene, 2-ethyl-4-benzylstyrene, and 4-(phenylbutyl)styrene. As the polymer component composing the block (a), styrene and α-methylstyrene are preferable.

The polymer or copolymer composing the above mentioned block (b) is a hydrogenated isoprene polymer or a hydrogenated isoprene-butadiene copolymer containing 40% or higher, preferably 45% or higher, of isoprene units bonded at 3,4- position relative to the total of isoprene units represented below, and 97% or more of double bonds having been hydrogenated.

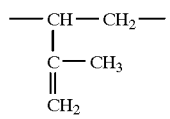

bonded at 3,4-position

In the present invention, there can be obtained a thermoplastic elastomer composition capable of providing a skin material having a sufficient wear resistance, when the content of the isoprene units bonded at the 3,4- position is 40% or higher relative to the total isoprene units.

A proportion of the polymer block (a) of styrene or a derivative thereof in the block copolymer (B) is preferably in a range of 5–50% by weight, more preferably 10–45% by weight. That is, a proportion of the above mentioned isoprene polymer block or an isoprene-butadiene copolymer block (b) is in a range preferably of 95–50% by weight, and more preferably 90–55% by weight.

A melt flow rate (MFR; ASTM D 1238, 230° C., 2.16 kg load) of the block copolymer (B) used in the present invention is preferably in a range of 0.01–30 g/10 min., more preferably 0.01–10 g/10 min. By using the block copolymer (B) of which melt flow rate is in the above mentioned range, there can be obtained a thermoplastic elastomer composition capable of providing a skin material having good scratch resistance..

As a block formation of the block copolymer (B), a structure of block (a)-block (b)-block (a) is most preferable. However, it is not limited thereto.

Such hydrogenated block copolymer (B) may be prepared by means of, for example, a following process.

First, a block copolymer before hydrogenation is prepared by means of the following processes.

(1) A process in which an alkyllithium compound is used as an initiator and styrene or a derivative thereof, and isoprene or an isoprene-butadiene mixture are polymerized successively;

(2) A process in which styrene or a derivative thereof, and then, isoprene or an isoprene-butadiene mixture are polymerized, which are coupled by using a coupling agent; and (3) A process in which dilithium compound is used as an initiator and isoprene or a isoprene-butadiene mixture, and then, styrene or a derivative thereof are polymerized successively.

Next, the block copolymer obtained by means of the above mentioned process is subjected to hydrogenation treatment, which results in the hydrogenated block copolymer (B). A block to be hydrogenated is the isoprene polymer block or the isoprene-butadiene copolymer block (b).

Details of the production process of such block copolymer (B) are described in, for example, Japanese Patent Laid-open Publication Nos. 2-300250 and 3-45646.

The block copolymer (B) as described above is used at a rate of 90-50 parts by weight, preferably 85-55 parts by weight, more preferably 80-55 parts by weight, relative to 100 parts by weight of the total amount of the polyethylene resin (A) and the block copolymer (B).

Partially Cross-linked Thermoplastic Olefin Elastomer (C)

The thermoplastic olefin elastomer (C) optionally used in the present invention comprises a crystalline polyolefin resin (c) and an olefin rubber (d).

The above mentioned crystalline polyolefin resin (c) may be a homopolymer or a copolymer of α-olefin having 2–20 carbon atoms.

Concrete examples of the above mentioned crystalline polyolefin resin (c) include following polymers and copolymers:

(1) Ethylene homopolymer (Either a low pressure technique or a high pressure technique can be used for preparation.);

(2) Copolymer of ethylene and 10% by mole or less of other α-olefin or a vinyl monomer such as vinyl acetate and ethyl acrylate;

(3) Propylene homopolymer;

(4) Random copolymer of propylene and 10% by mole or less of other α-olefin;

(5) Block copolymer of propylene and 30% by mole or less of other α-olefin;

(6) 1-butene homopolymer;

(7) Random copolymer of 1-butene and 10% by mole or less of other α-olefin;

(8) 4-methyl-1-pentene homopolymer; and (9) Random copolymer of 4-methyl-1-pentene and 20% by mole or less of other α-olefin.

Concrete examples of the above mentioned α-olefin include ethylene, propylene, 1-butene, 4-methyl-1-pentene, 1-hexene, and 1-octene.

Of the above mentioned crystalline polyolefin resins, propylene homopolymers and propylene-α-olefin copolymers having a propylene content of 50% by mole or more are particularly preferable.

The crystalline polyolefin resins as described above may be used alone or in combination with each other.

The crystalline polyolefin resin (c) used in the present invention preferably has a melt flow rate (MFR; ASTMD 1238, 230° C., 2.16 kg load) in a range of 0.01–100 g/10 min., more preferably 0.3–70 g/10 min.

A degree of crystallinity of the crystalline polyolefin resin. (c) measured through X-ray is generally in a range of 5–100%, preferably 20–80%.

The crystalline polyolefin resin (c) composing the thermoplastic elastomer (C) is used at a rate of 10–90 parts by weight, preferably 10–80 parts by weight, and more preferably 20–70 parts by weight, relative to 100 parts by weight of the total amount of the crystalline polyolefin resin (c) and the olefin rubber (d).

Concrete examples of the above mentioned olefin rubber (d) include following rubbers:

(1) Ethylene-propylene copolymer rubber (Ethylene/propylene (molar ratio)=approximately 90/10 to 50/50);

(2) Ethylene-1-butene copolymer rubber (Ethylene/1-butene (molar ratio)=approximately 90/10 to 50/50); and (3) Ethylene-propylene-nonconjugated diene copolymer rubber (Ethylene/propylene (molar ratio)=approximately 90/10 to 50/50).

The above mentioned nonconjugated diene may be, specifically, dicyclopentadiene, 1,4-hexadiene, and ethylidene norbornene.

The above mentioned olefin rubber (d) may be in a non cross-linked state, a partially cross-linked state, or a completely cross-linked state in the thermoplastic olefin elastomer (C). In the present invention, the partially cross-linked state is particularly preferred.

The olefin rubber (d) composing the thermoplastic elastomer (C) is used at a rate of 90-10 parts by weight, preferably 90-20 parts by weight, more preferably 80-30 parts by weight, relative to 100 parts by weight of the total amount of the crystalline polyolefin resin (c) and the olefin rubber (d).

By using the thermoplastic elastomer (C) in which the olefin rubber (d) is blended in the above mentioned proportion, there can be obtained a thermoplastic elastomer composition capable of providing a soft skin material excellent in scratch resistance.

The thermoplastic olefin elastomer (C) may be blended with additives, if necessary, such as mineral oil-based softening agents, heat stabilizers, antistatic agents, weathering stabilizers, antioxidants, fillers, colorants, and lubricants, as long as the object of the present invention is not badly affected.

A concrete example of the thermoplastic olefin elastomer (C) advantageously used in the present invention includes a thermoplastic elastomer which comprises:

60-10 parts by weight of the crystalline polypropylene (c);

40-90 parts by weight of the olefin rubber (d) comprising an ethylene-propylene copolymer rubber or an ethylene-propylene-diene copolymer rubber (the total amount of the components (c) and (d) is 100 parts by weight); and 5–100 parts by weight of a mineral oil-based softening agent, in which the olefin rubber is partially cross-linked.

The thermoplastic elastomer (C) used in the present invention can be obtained by means of dynamically heat-treating a blended product containing the crystalline polyolefin resin (c) and the olefin rubber (d) in the presence of an organic peroxide.

The above mentioned organic peroxide includes, for example, dicumyl peroxide, di-tert-butyl peroxide, 2,5-dimethyl-2,5-di-(tert-butyl peroxy)hexane, 2,5-dimethyl-2,5-di-(tert-butyl peroxy)hexyne-3, 1,3-bis(tert-butyl peroxyisopropyl)benzene, 1,1-bis(tert-butyl peroxy)-3,3,5-trimethyl cyclohexane, n-butyl-4,4-bis(tert-butyl peroxy) valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropyl carbonate, diacetyl peroxide, lauroyl peroxide, and tert-butylcumyl peroxide.

Of these, 2,5-dimethyl-2,5-di-(tert-butyl peroxy)hexane, 2,5-dimethyl-2,5-di-(tert-butyl peroxy)hexyne-3, 1,3-bis(tert-butyl peroxyisopropyl)benzene, 1,1-bis(tert-butyl peroxy)-3,3,5-trimethyl cyclohexane, and n-butyl-4,4-bis(tert-butyl peroxy)valerate are preferable, in view of smell and scorch stabilizing properties. Of these, 1,3-bis(tert-butyl peroxyisopropyl)benzene is most preferable.

The organic peroxide used during the preparation of the thermoplastic olefin elastomer (C) is used at a rate of 0.05–3% by weight, preferably 0.1–1% by weight, relative to 100 parts by weight of the total amount of the crystalline polyolefin (c) and the olefin-based rubber (d).

In a cross-linking treatment with the organic peroxide, it is preferable to use a cross-linking auxiliary such as sulfur or a multifunctional vinyl monomer such as divinyl benzene at a rate of 0.1–2% by weight, particularly 0.3–1% by weight, relative to the total amount of the above mentioned product to be subjected to the cross-linking treatment. When a blending ratio of the cross-linking auxiliary or the multifunctional vinyl monomer is within the above mentioned range, the resultant thermoplastic elastomer is not changed in physical properties due to its heat history when subjected to processing and molding and has good fluidability because the cross-linking auxiliary and the multifunctional vinyl monomer do not remain in the elastomer as unreacted monomers.

The term "dynamically heat-treated" means that the components as described above are kneaded in a molten state by using, for example, a non-open type Banbury mixer, an extruder, a kneader, or a continuous mixer.

The dynamic heat-treatment is preferably carried out in a non-open type kneader, and is preferably carried out in an inert gas such as nitrogen.

Kneading is preferably carried out at such a temperature that the half-life of the organic peroxide used is shorter than 1 minute. A kneading temperature is generally at 150–280° C., preferably at 170–240° C., and a kneading time is 1–20 minutes, preferably 1–5 minutes. Furthermore, a shearing stress applied during the kneading is generally determined within the range of $10-10^4$ sec$^{-1}$, preferably $10^2-10^4$ sec$^{-1}$ of a shearing rate.

The thermoplastic elastomer (C) in which the olefin rubber (d) is partially cross-linked is obtained in the above mentioned manner.

Herein, the term "partially cross-linked" represents a case where a gel content (cyclohexane insolubles) measured according to the following method is, for example, 10% or higher, and particularly from not lower than 20% to lower than 98%. In the present invention, it is preferable that the gel content is 30% or higher.

By using the thermoplastic elastomer (C) having the gel content of within the above mentioned range, the resultant thermoplastic elastomer composition is excellent in fluidability when molded and can provide a skin material having good mechanical strength and heat resistance.

Measurement Method of Gel Content (Cyclohexane Insolubles)

Approximately 100 mg of a sample of the thermoplastic elastomer is weighed and cut into a thin piece of 0.5 mm×0.5 mm×0.5 mm. Then, the resultant thin piece is immersed at 23° C. for 48 hours in 30 ml of cyclohexane in a sealed container.

Next, this sample is taken on a filter paper and is dried at a room temperature over 72 hours until it becomes constant weight.

A value obtained by means of subtracting the weight of cyclohexane insoluble components (fibrous filler, filler, pigments, etc.) other than polymer components from the weight of this dried residue is defined as a "corrected final weight (Y)".

On the other hand, a value obtained by means of subtracting the weight of cyclohexane soluble components (such as a softening agent) other than polymer components and the weight of the cyclohexane insoluble component (fibrous filler, filler, pigments, etc.) other than polymer components from the weight of this dried residue is defined as a "corrected initial weight (X)".

In this event, the gel content (cyclohexane insolubles) can be given by the following equation:

Gel content (wt. %)=(corrected final weight (Y))/(corrected initial weight (X))×100.

In the present invention, the thermoplastic elastomer (C) is used at a rate of 5–100 parts by weight, preferably 5–80 parts by weight, more preferably 10–50 parts by weight, relative to 100 parts by weight of the total amount of the above mentioned polyethylene resin (A) and the block copolymer (B).

By using the thermoplastic elastomer (C) in the above mentioned ratio, there can be obtained the thermoplastic elastomer composition capable of providing a skin material having excellent heat resistance and good scratch resistance.

Silicone Oil (D)

The silicone oil (D) optionally used in the present invention includes, for example, dimethyl silicone oil, phenylmethyl silicone oil, fluoro silicone oil, tetramethyl tetraphenyl trisiloxane, and modified silicone oil. Of these, dimethyl silicone oil and phenylmethyl silicone oil are suitably used.

A kinematic viscosity [JIS K 2283, 25° C.] of these silicone oils (D) is preferably in a range of 30–10,000 cSt, more preferably 100–3,000 cSt.

The silicone oil (D) described above is used at a rate of 1–10 parts by weight, preferably 1–5 parts by weight, and more preferably 2–5 parts by weight, relative to 100 parts by weight of the total amount of the polyethylene resin (A) and the block copolymer (B).

By using the silicone oil (D) as described above at a ratio described above, the thermoplastic elastomer composition having excellent scratch resistance is obtained.

Other Components

In the present invention, a softening agent may be added to the thermoplastic elastomer composition if necessary, as long as the object of the present invention is deteriorated.

Softening agents generally used for rubbers are suitable as such a softening agent. More concretely, the softening agent includes:

petroleum-based materials such as process oil, lubricant, paraffin, liquid paraffin, petroleum asphalt, and vaseline;

coal tars such as coal tar and coal tar pitch;

fatty oils such as castor oil, linseed oil, rape oil, soy bean oil, and coconut oil;

waxes such as tall oil, bees wax, carnauba wax, and lanolin;

fatty acids such as ricinoleic acid, palmitic acid and stearic acid, and metal salts thereof;

synthetic polymers such as petroleum resin, coumarone-indene resin, and atactic polypropylene;

ester plasticizers such as dioctyl phthalate, dioctyl adipate, and dioctyl sebacate;

other microcrystalline waxes; liquid polybutadiene or modified products thereof or hydrogenated products thereof; and liquid Thiokol.

Such softening agents are used at a rate of 1–40 parts by weight, preferably 3–30 parts by weight, relative to 100 parts by weight of the total amount of the above mentioned polyethylene resin (A), the block copolymer (B), the thermoplastic olefin elastomer (C), and the silicone oil (D). The thermoplastic olefin elastomer (C) and the silicone oil (D) may be 0 parts by weight because they are optional components.

Furthermore, in the present invention, an inorganic filler may be added if necessary to the thermoplastic elastomer composition, as long as the object of the present invention is not deteriorated.

Such inorganic fillers includes, for example, calcium carbonate, calcium silicate, clay, kaolin, talc, silica, diatomaceous earth, mica powder, asbest, barium sulfate, aluminum sulfate, calcuim sulfate, magnesium carbonate, molybdenum disulfide, glass fibers, glass bulbs, shirasu-balloon, graphite and alumina.

Preparation of Thermoplastic Elastomer Composition

The thermoplastic elastomer composition used in the present invention may be prepared by mixing individual components of the above mentioned polyethylene resin (A) and the block copolymer (B), and if necessary, the thermoplastic olefin elastomer (C) and the silicone oil (D), and then dynamically heat-treating it.

Herein, the term dynamically heat-treating means they are kneaded in a molten state. The dynamic heat-treatment is preferably carried out in a non-open type machine such as a Banbury mixer, a kneader, a monoaxial extruder, or a biaxial extruder, and is preferably carried out in an inert gas such as nitrogen. The kneading temperature is generally in a range of from the melting point of the polyolefin resin to 250° C. and the kneading time is preferably 1–10 minutes. Furthermore, the shearing force applied during the kneading is preferably in the range of 100–10,000 sec$^{-1}$ at the shearing rate.

Steering Wheel for Motor Vehicles

The steering wheel for the motor vehicles according to the present invention comprises a steering wheel base 8 formed of the metals mentioned above and the skin material 9 formed of the thermoplastic elastomer composition.

The steering wheel for the motor vehicles according to the present invention may be molded by means of an injection molding technique for the steering wheels for the motor vehicles, which is well known in the art.

For example, a steering wheel for the motor vehicles having a skin material on which grain patterns are formed may be manufactured by placing a base in a mold on which surface the grain pattern is formed and injection-molding the above mentioned composition with using the mold.

Effect of the Invention

The steering wheel for the motor vehicles according to the present invention comprises a skin material comprising the thermoplastic elastomer composition containing at a particular rate the polyethylene resin (A) and the hydrogenated block copolymer (B) composed of the polymer block (a) of styrene or a derivative thereof and the isoprene polymer block or the isoprene-butadiene copolymer block (b).

Therefore, according to the present invention, there is provided a steering wheel for the motor vehicles comprising a skin material of the injection-moldable soft thermoplastic olefin elastomer composition having a low specific gravity and excellent wear resistance, which is capable of recycling and gives excellent feel of touch.

EXAMPLES

The present invention is described in conjunction is examples below. However, the present invention is not limited to those examples.

Components used in the examples and comparative examples are as follows:

○ Polyethylene Resin (A)
 (A-1) high-density polyethylene (HDPE)
  weight average molecular weight (Mw): 650,000
  density (d): 0.95 g/cm$^3$
 (A-2) high-density polyethylene (HDPE)
  weight average molecular weight (Mw): 450,000
  density (d): 0.95 g/cm$^3$
 (A-3) high-density polyethylene (HDPE)
  weight average molecular weight (Mw): 50,000
  density (d): 0.95 g/cm$^3$
 (A-4) high-pressure low-density polyethylene (HPLDPE)
  weight average molecular weight (Mw): 50,000
  density (d): 0.92 g/cm$^3$
 (A-5) straight chain low-density polyethylene (LLDPE)
  weight average molecular weight (Mw): 50,000
  density (d): 0.92 g/cm$^3$ ○ Block Copolymer (B)
 (B-1) styrene-isoprene-styrene block copolymer
  1) styrene content: 20% by weight
  2) content of isoprene units bonded at 3,4- position relative to the total isoprene units: 55%
  3) degree of hydrogenation: 99%
  4) MFR (ASTM D 1238, 230° C., 2.16 kg load): 2.5 g/10 min.

○ Thermoplastic Olefin Elastomer (C)
 (C-1) thermoplastic elastomer produced by the following process:
  75 parts by weight of ethtylene-propyrene-5-ethylidene-2-norbornene copolymer rubber having an ethylene content of 70% by mole, an iodine value of 12, and Mooney viscosity (ML$_{1+4}$ (100° C.)) of 120 and
  25 parts by weight of polypropylene having MFR (ASTM D 1238, 230° C., 2.16 kg load) of 13 g/10 min. and a density of 0.91 g/cm$^3$ were kneaded at 180° C. for 5 minutes in a nitrogen atmosphere by using a Banbury mixer. The resultant kneaded product was passed between rolls to form a sheet, which was cut with a sheet cutter to produce rectangular pellets.

Next, 100 parts by weight of the rectangular pellets, 0.3 parts by weight of dicumyl peroxide and 0.5 parts by weight of divinyl benzene were agitated and mixed by using a Henschel mixer. The resultant mixture was extruded at 220° C. in a nitrogen atmosphere by using a monoaxial extruder having L/D of 30 and the screw diameter of 50 mm to produce pellets of a partially cross-linked thermoplastic elastomer (C-1).

A gel content of the resultant thermoplastic elastomer (C-1) was 96%.

○ Silicone Oil (D)
 (D-1) SH200
  Trade Name SH200 available from Toray Silicone Co.

○ Hydrogenated Product of Styrene-ethylene-butylene-styrene Block Copolymer (SEBS)
 Styrene content: 20% by weigh
 Hydrogenation rate: 99%
 MFR: 2.1 g/10 min.

EXAMPLE 1

20 parts by weight of the high-density polyethylene (A-1), 80 parts by weight of the styrene-isoprene-styrene block copolymer (B-1), and 3 parts by weight of the silicone oil SH200 (D-1) were well agitated and mixed in a Henschel mixer and were kneaded through a biaxial extruder having the screw diameter of 30 mm set at 220° C. to produce pellets of the thermoplastic elastomer composition.

Next, material evaluations as a skin material and evaluations of a steering wheel molded product for motor vehicles were carried out in the following manner on the thermoplastic elastomer composition obtained as described above.

(1) Ford Abrasion Test

The pellets of the thermoplastic elastomer composition obtained in the above mentioned manner were used to produce an injection molded sheet, which was then press molded to produce 10 sheet-like test pieces 1 having regular grain patterns illustrated in FIG. 1. The produced test piece 1 had a size of 97 mm in length, 97 mm in width, and 1 $\mu$m in thickness, and had a grain pattern of 100 $\mu$m of depth, 280 $\mu$m of distance between adjacent concave portions and 280 $\mu$m of distance between adjacent convex portions.

Figure 2A:
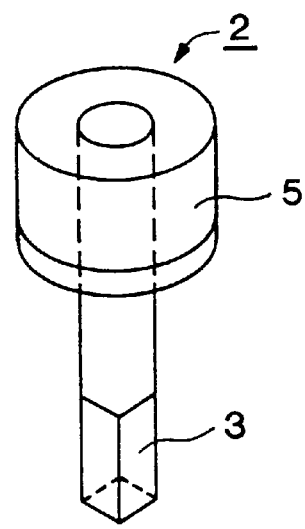
FIG. 2 (a) is a perspective view of a steel jig used for the Ford abrasion test, and FIG. 2 (b) is a explanational view illustrating a test method of the Ford abrasion test.
Figure 2B:
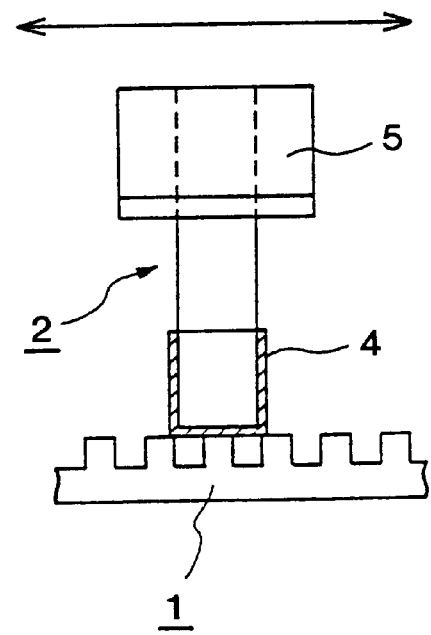

The Ford abrasion test was conducted on these test pieces. Outlines of the Ford abrasion test were shown in FIG. 2.

First, a rod-shaped steel jig 2 was covered with a cotton canvas (normal #10, JIS L3102) 4 at one end formed into a prism 3 of 10 mm square and was provided with a weight 5 of 200 g load at the other end thereof.

Next, the end of the jig 2 covered with the cotton canvas 4 was contacted to the test piece 1 having the above mentioned regular grain patterns. The jig 2 was moved forward and backward in the following conditions in the direction perpendicular to the direction of grooves formed in the surface of the test piece 1 to make the test piece 1 worn down.

Test Conditions
 Reciprocation cycle: 60 times/min.
 Stroke: 40 mm

The difference in thickness of the test piece 1 before and after the abrasion test was used as an index to evaluate the wear resistance. The difference in thickness of the test piece before and after the abrasion test, which is used as the index, is an average of those for 10 test pieces.

(2) Hardness Test

A hardness test was carried out on the JIS A hardness according to JIS K 6301.

Figure 3:
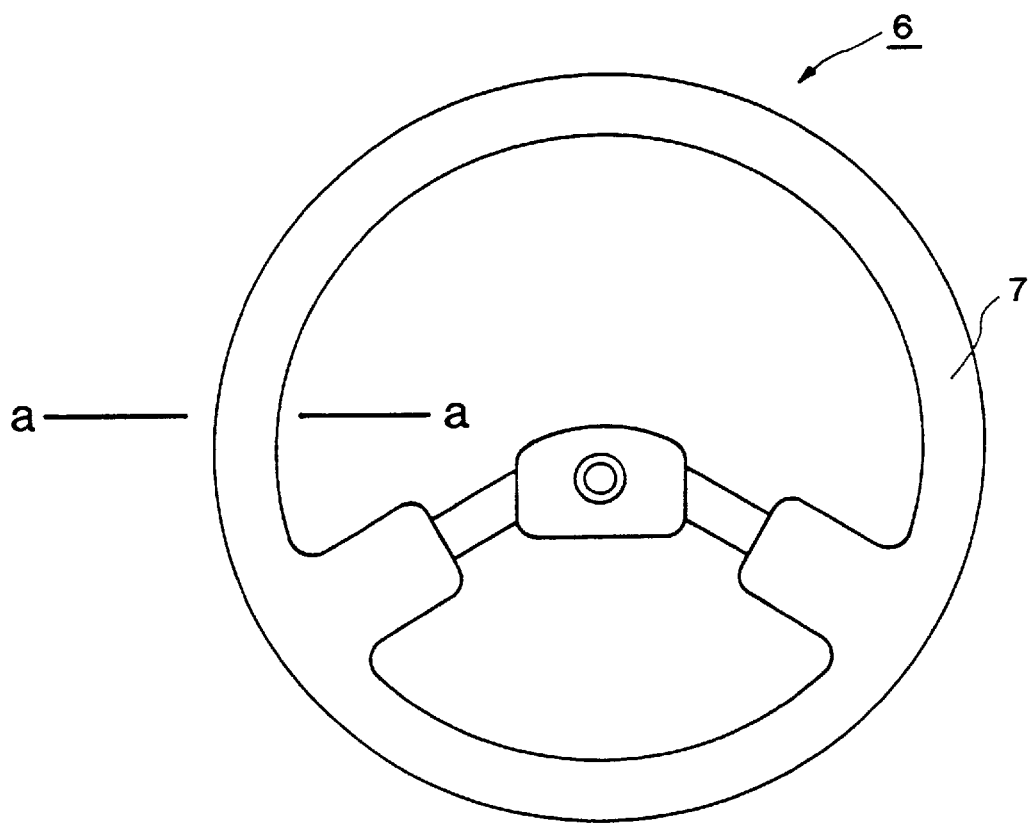
FIG. 3 is a plan view of a steering wheel for motor vehicles molded in examples, etc.
Figure 4:
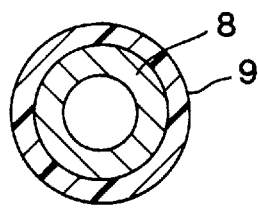
FIG. 4 is an enlarged cross-section of the steering wheel taken through line a—a of FIG. 3.

(3) Organoleptic Examination on Feel of Stickiness and (4) Organoleptic Examination on Feel of Soft Touch By using the pellets of the above mentioned thermoplastic elastomer composition which was the production material of the skin material and an iron alloy body of φ8 mm, a steering wheel 6 for the motor vehicles shown in FIG. 3 was molded at a molding temperature of 230° C. to 260° C. by means of a 550 t injection molding machine available from Toshiba Corporation.

The maximum thickness of the skin material layer was 10 mm and the minimum thickness of the skin material layer was 8 mm in cross section at a solid ring of a grip portion of the steering wheel 6 for the motor vehicles obtained in the above mentioned manner.

Next, feel of touch (feel of stickiness and feel of soft touch) upon gripping a grip 7 of the steering wheel molded in the above mentioned manner was evaluated with several monitors. These evaluations were carried out at a room temperature, and evaluation results were determined through mutual discussion of the monitors.

Decision Criteria for Feel of Stickiness

| 5: | no feel of stickiness | passed |
|---|---|---|
| 4: | very slight feel of stickiness | passed |
| 3: | slight feel of stickiness | passed |
| 2: | obvious feel of stickiness | not passed |
| 1: | significant feel of stickiness | not passed |

Decision Criteria for Feel of Soft Touch

| 3: | felt as soft | passed |
|---|---|---|
| 2: | slightly felt as soft | passed |
| 1: | felt as hard | not passed |

Results are given in Table 1.

EXAMPLES 2 TO 11

Example 1 was repeated to prepare pellets of the thermoplastic elastomer composition except that the components indicated in Table 1 were used at the rate indicated in Table 1 for the preparation of the thermoplastic elastomer composition. The above mentioned Ford abrasion test, the hardness test, and the organoleptic examination were carried out in the same manner as in Example 1.

Results are given in Table 1.

COMPARATIVE EXAMPLE 1

Example 1 was repeated to carry out the above mentioned Ford abrasion test, the hardness test, and the organoleptic examination in the same manner as in Example 1 except that the styrene-isoprene-styrene block copolymer (B-1) alone was used instead of the thermoplastic elastomer composition in Example 1.

Results are given in Table 1.

COMPARATIVE EXAMPLE 2

Example 1 was repeated to carry out the above mentioned Ford abrasion test, the hardness test, and the organoleptic examination in the same manner as in Example 1 except that the thermoplastic elastomer (C-1) alone was used instead of the thermoplastic elastomer composition in Example 1.

Results are given in Table 1.

COMPARATIVE EXAMPLES 3 AND 4

Example 1 was repeated to prepare pellets of the thermoplastic elastomer composition in the same manner as in Example 1 except that the components indicated in Table 1 were used at the rate indicated in Table 1 for the preparation of the thermoplastic elastomer composition. The above mentioned Ford abrasion test, the hardness test, and the organoleptic examination were carried out in the same manner as in Example 1.

Results are given in Table 1.

TABLE 1

| | Example | | | | | |
|---|---|---|---|---|---|---|
| | 1 | 2 | 3 | 4 | 5 | 6 |
| Polyethylene resin (A) | 20 | 25 | — | — | — | — |
| HDPE (A-1) | | | | | | |
| Mw = 650,000 d = 0.95 g/cm³ | | | | | | |
| HDPE (A-2) | — | — | 20 | — | — | — |
| Mw = 450,000 d = 0.95 g/cm³ | | | | | | |
| HDPE (A-3) | — | — | — | 20 | — | — |
| Mw = 50,000 d = 0.95 g/cm³ | | | | | | |
| HPLDPE (A-4) | — | — | — | — | 20 | — |
| Mw = 50,000 d = 0.92 g/cm³ | | | | | | |
| LLDPE (A-5) | — | — | — | — | — | 20 |
| Mw = 50,000 d = 0.92 g/cm³ | | | | | | |
| Block copolymer (B) | 80 | 75 | 80 | 80 | 80 | 80 |
| styrene-isoprene-styrene block copolymer (B-1) | | | | | | |
| Thermoplastic olefin elastomer (C) thermoplastic elastomer (C-1) | — | — | — | — | — | — |
| Silicone oil (D) | 3 | 3 | 3 | 3 | 3 | 3 |
| SH200 (D-1) | | | | | | |
| Hydrogenated product of SEBS | — | — | — | — | — | — |
| Physical properties and feel of touch of skin material | | | | | | |
| Ford abrasion test [μm] | 0.5 | 0.3 | 1 | 2 | 4 | 4 |
| JIS A hardness | 73 | 78 | 72 | 74 | 65 | 67 |
| feel of stickiness | 4 | 4 | 4 | 3 | 3 | 3 |
| feel of soft touch | 3 | 2 | 3 | 2 | 3 | 3 |

| | Example | | | | |
|---|---|---|---|---|---|
| | 7 | 8 | 9 | 10 | 11 |
| Polyethylene resin (A) | 29 | 42 | 36 | 31 | 20 |
| HDPE (A-1) | | | | | |
| Mw = 650,000 d = 0.95 g/cm³ | | | | | |
| HDPE (A-2) | — | — | — | — | — |
| Mw = 450,000 d = 0.95 g/cm³ | | | | | |
| HDPE (A-3) | — | — | — | — | — |
| Mw = 50,000 d = 0.95 g/cm³ | | | | | |
| HPLDPE (A-4) | — | — | — | — | — |
| Mw = 50,000 d = 0.92 g/cm³ | | | | | |
| LLDPE (A-5) | — | — | — | — | — |
| Mw = 50,000 d = 0.92 g/cm³ | | | | | |
| Block copolymer (B) | 71 | 58 | 64 | 69 | 80 |
| styrene-isoprene-styrene block copolymer (B-1) | | | | | |
| Thermoplastic olefin elastomer (C) thermoplastic elastomer (C-1) | 43 | 67 | 43 | 25 | — |
| Silicone oil (D) | 3 | 3 | 3 | 3 | — |
| SH200 (D-1) | | | | | |
| Hydrogenated product cf SEBS | — | — | — | — | — |
| Physical properties and feel of touch of skin material | | | | | |
| Ford abrasion test [μm] | 5 | 5 | 3 | 1 | 2 |
| JIS A hardness | 70 | 78 | 80 | 78 | 74 |
| feel of stickiness | 4 | 5 | 5 | 4 | 4 |
| feel of soft touch | 3 | 2 | 2 | 2 | 2 |

| | Comparable Example | | | |
|---|---|---|---|---|
| | 1 | 2 | 3 | 4 |
| Polyethylene resin (A) | — | — | 20 | 20 |
| HDPE (A-1) | | | | |
| Mw = 650,000 d = 0.95 g/cm³ | | | | |
| HDPE (A-2) | — | — | — | — |
| Mw = 450,000 d = 0.95 g/cm³ | | | | |
| HDPE (A-3) | — | — | — | — |
| Mw = 50,000 d = 0.95 g/cm³ | | | | |
| HFLDPE (A-4) | — | — | — | — |
| Mw = 50,000 d = 0.92 g/cm³ | | | | |
| LLDPE (A-5) | — | — | — | — |
| Mw = 50,000 d = 0.92 g/cm³ | | | | |
| Block copolymer (B) | 100 | — | — | — |
| styrene-isoprene-styrene block copolymer (B-1) | | | | |

TABLE 1-continued

| | | | | |
|---|---|---|---|---|
| Olefin-based thermoplastic elastomer (C) | — | 100 | 80 | — |
| thermoplastic elastomer (C-1) | | | | |
| Silicone oil (D) SH200 (D-1) | — | — | 3 | 3 |
| Hydrogenated product of SEBS | — | — | — | 80 |
| Physical properties and feel of touch of skin material | | | | |
| Ford abrasion test [μm] | 9 | 25 | 10 | 8 |
| JIS A hardness | 52 | 45 | 84 | 66 |
| feel of stickiness | 1 | 2 | 5 | 2 |
| feel of soft touch | 3 | 3 | 1 | 3 |

(Note) The units of the components values in the table are parts by weight.

It is apparent from Table 1 that the skin material used in Examples of the present invention are well-balanced materials for the skin material of the steering wheels, as compared with the skin material used in Comparative Examples, because they are superior in wear resistance and feel of touch, i.e., they provide excellent feel of soft touch and no or slight feel of stickiness.

We claim:

1. A steering wheel for motor vehicles which steering wheel comprises a steering wheel base covered with a skin material said skin material comprising:
   (I) 10–45 parts by weight of a polyethylene resin (A); and
   (II) 90-55 parts by weight of a block copolymer (B) comprising a polymer block (a) selected from the group consisting of styrene and a derivative thereof and (b) a polymer block selected from the group consisting of an isoprene polymer block and an isoprene-butadiene copolymer block, said block (b) containing 40% or higher of isoprene units bonded at 3,4- position relative to the total isoprene units and 97% or more of double bonds having been hydrogenated,
   wherein the total amount of the components (A) and (B) is 100 parts by weight.

2. A steering wheel for motor vehicles as claimed in claim 1 wherein a partially cross-linked thermoplastic olefin elastomer (C) is blended in said thermoplastic elastomer composition at 5–100 parts by weight relative to 100 parts by weight of the total amount of the polyethylene resin (A) and the block copolymer (B).

3. A steering wheel for motor vehicles as claimed in claim 1 wherein a silicone oil (D) is blended in said thermoplastic elastomer composition at 1–10 parts by weight relative to 100 parts by weight of the total amount of the polyethylene resin (A) and the block copolymer (B).

4. A steering wheel for motor vehicles as claimed in claim 2 wherein a silicone oil (D) is blended in said thermoplastic elastomer composition at 1–10 parts by weight relative to 100 parts by weight of the total amount of the polyethylene resin (A) and the block copolymer (B).

5. A steering wheel for motor vehicles of claim 1 wherein skin material comprises (I) 20–45 parts by weight of the polyolefin resin (A) and 80-55 parts by weight of the block copolymer (B).

6. A steering wheel for motor vehicles which steering wheel comprises a steering wheel base covered with a skin material said skin material comprising:
   (I) 10–45 parts by weight of a polyethylene resin (A); and
   (II) 90-55 parts by weight of a block copolymer (B) comprising a polymer block (a) of 10 to 45% by weight of styrene and a polymer block (b) of 90-55% by weight of isoprene, said isoprene polymer block containing 40% or higher of isoprene units bonded at 3,4- position relative to the total isoprene units and 97% or more of isoprene double bonds having been hydrogenated,
   wherein the total amount of the components (A) and (B) is 100 parts by weight.

7. A steering wheel for motor vehicles as claimed in claim 6 wherein a cross-linked thermoplastic olefin elastomer (C) is blended in said thermoplastic elastomer composition in an amount of 5–100 parts by weight relative to 100 parts by weight of the total amount of the polyethylene resin (A) and the block copolymer (B).

8. A steering wheel for motor vehicles as claimed in claim 6 wherein a silicone oil (D) is blended in said thermoplastic elastomer composition in an amount of 1–10 parts by weight relative to 100 parts by weight of the total amount of the polyethylene resin (A) and the block copolymer (B).

9. A steering wheel for motor vehicles as claimed in claim 7 wherein a silicone oil (D) is blended in said thermoplastic elastomer composition in an amount of 1–10 parts by weight relative to 100 parts by weight of the total amount of the polyethylene resin (A) and the block copolymer (B).

10. A steering wheel for motor vehicles as claimed in claim 6 wherein said polymer block (b) comprises isoprene-butadiene copolymer.

* * * * *